(12) United States Patent
Mancour

(10) Patent No.: US 7,525,974 B2
(45) Date of Patent: Apr. 28, 2009

(54) METHOD AND APPARATUS FOR CAPABILITY BASED ADDRESSING IN A COMMUNICATIONS NETWORK

(75) Inventor: Timothy Mancour, Wrentham, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 1050 days.

(21) Appl. No.: 10/736,108

(22) Filed: Dec. 15, 2003

(65) Prior Publication Data

US 2005/0100026 A1 May 12, 2005

Related U.S. Application Data

(60) Provisional application No. 60/518,911, filed on Nov. 10, 2003.

(51) Int. Cl.
*H04L 12/28* (2006.01)
*H04L 12/56* (2006.01)

(52) U.S. Cl. .................. 370/400; 370/401; 370/256; 370/392; 370/432

(58) Field of Classification Search .................. None
See application file for complete search history.

(56) References Cited

U.S. PATENT DOCUMENTS

| | | | | |
|---|---|---|---|---|
| 5,450,407 A | * | 9/1995 | Perlman et al. | 370/392 |
| 6,496,485 B1 | * | 12/2002 | Le | 370/257 |
| 6,813,250 B1 | * | 11/2004 | Fine et al. | 370/256 |
| 6,895,020 B2 | * | 5/2005 | Morris et al. | 370/474 |
| 7,095,747 B2 | * | 8/2006 | Sarmiento et al. | 370/401 |
| 2003/0193959 A1 | * | 10/2003 | Lui et al. | 370/401 |
| 2004/0109443 A1 | * | 6/2004 | Gai et al. | 370/389 |
| 2004/0165595 A1 | * | 8/2004 | Holmgren et al. | 370/395.3 |
| 2004/0174828 A1 | * | 9/2004 | Elie-Dit-Cosaque et al. | 370/254 |
| 2005/0163102 A1 | * | 7/2005 | Higashitaniguchi et al. | 370/351 |
| 2005/0259597 A1 | * | 11/2005 | Benedetto et al. | 370/254 |
| 2007/0124498 A1 | * | 5/2007 | Kaluve et al. | 709/242 |

* cited by examiner

*Primary Examiner*—Ajit Patel
(74) *Attorney, Agent, or Firm*—Anderson Gorecki & Manaras LLP

(57) ABSTRACT

Capability based addressing in a communication network enables protocol data units (PDUs) to be addressed to network constructs such as network elements or interfaces with particular capabilities rather than with specific addresses. This allows PDUs to be addressed to network constructs without first identifying the network constructs or even knowing of the existence of the construct. By broadcasting a capability based PDU onto a network it is therefore possible to communicate with a particular type of device rather than with a particular identified device. This is applicable, for example, in connection with loop and backdoor detection. By broadcasting a PDU onto a network, e.g. using a hello-response protocol, it is possible to identify network constructs that should not be present on the network if the communication network is configured properly. An alarm or corrective action may be taken upon detection of a response.

19 Claims, 3 Drawing Sheets

METHOD AND APPARATUS FOR CAPABILITY BASED ADDRESSING IN A COMMUNICATIONS NETWORK

BACKGROUND OF THE INVENTION

1. Field of the Invention

The present invention relates to communication networks and, more particularly, to a method and apparatus for capability based addressing in a communication network.

2. Description of the Related Art

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet Frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

Customers connect to service provider networks to obtain access to the communication resources provided by the service provider. The customer's network element that connects the customer's network to the provider's network will be referred to herein as a Consumer Edge (CE) network device. A CE may be a bridge, router, work station, or any other network element configured to connect the customer's network to the provider's network.

The network element on the service provider's network that enables the customer to connect to the subscriber's network will be referred to herein as a Provider Edge network device (PE). In a bridged Ethernet network scenario, a PE may be an 802.1 ad bridge. In other network topologies, the PE may be another network device capable of providing connectivity to the customer network. PEs are used on the edge of the network to connect to CEs as well as within the network to enable interconnection between interior domain borders and to interconnect the provider's network with other providers' networks. Within the provider's network, Provider (P) network devices are configured to interconnect PEs. In a bridged Ethernet context, the P network devices may be formed, for example, as 802.1d or 802.1ad bridges. The invention is not limited to this embodiment, however, as other network elements may be used as well.

FIG. 1 illustrates one example of a bridged Ethernet network 10. Although the invention will be described as being particularly applicable to bridged Ethernet networks, the invention is not limited in this manner as the invention may more broadly be applied to other network architectures as described in greater detail below.

As shown in FIG. 1, a provider network 10 contains P network devices 14 configured to interconnect PE network devices 16. The PE network devices are connected to CE network devices 18 or to other PE network devices, for example across an administrative boundary within a domain or at an edge of the domain to another domain.

In a bridged network scenario, virtual LAN segments (commonly known as a VLAN) may be defined so that network elements may be interconnected regardless of physical location. Examples of network elements that provide VLAN connectivity are 802.1q and 802.1ad bridges. The invention is not limited to this embodiment, however, as other network elements may be used as well.

In a bridged network, loops are undesirable since loops within the bridged network allow traffic to circulate endlessly, thus causing congestion on the links forming the loop. Within the provider network 10, loops 12 may be prevented by implementation of a spanning tree protocol within the domain. Spanning tree protocols are generally used to prune links between the bridges to avoid loops from forming in the bridged network. There are several different spanning tree protocols, such as the Spanning Tree Protocol (STP) defined in IEEE 802.1D, Rapid Spanning Tree Protocol (RSTP), which builds on STP by significantly decreasing the convergence times of the spanning tree, Multi-Spanning-Tree (MSTP) which extends RSTP by allowing VLAN segments to be mapped to separate spanning-trees thereby improving the load balancing characteristics of the network, and many other spanning tree protocols.

Loops between the provider and customer network may also be prevented if the customer uses a spanning tree protocol on its network. However, occasionally a customer will not use a spanning tree protocol. In this instance, the customer may unintentionally create a loop. The loop may be direct as illustrated or indirect through several customer devices. Thus, where a customer does not use a spanning tree protocol, it is possible for loops to form in the bridged Ethernet network despite efforts by the service providers to prevent them. Loops enable Ethernet traffic to be bridged endlessly thus increasing congestion on the links forming the loop. Since the presence of a loop has the potential to highly degrade network performance, detection and avoidance of loop creation is desirable.

Additionally, even where a loop is not formed by the adoption of a link on the customer network, a customer may cause the potential for a loop to be formed, such as by enabling a back door connection to another provider's network. FIGS. 2A and 2B illustrate two examples of how a back door may be formed on a customer's network and how that may adversely potentially result in the formation of a loop. In these two examples, it is assumed that the two PE/CE connections are to different providers, although the same situation may occur where the PEs are owned by the same provider. As shown in FIG. 2A, a back door may exist where a customer contracts to obtain network connectivity from two different providers and a CE network device is used to connect to both network providers. Connecting to two different providers may be advantageous for redundancy purposes. However, where the providers' networks are connected, the potential for loop formation occurs. Similarly, as shown in FIG. 2B, the potential for loop formation may occur where the customer connects to two different providers using different CE network devices that are otherwise connected by the subscriber network.

Network operators need to be able to verify network performance and to reduce operational costs. To facilitate this, the concept of Operation, Administration, and Maintenance (OAM) functionality has been developed and is documented in International Telecommunication Union (ITU) draft standard Y. 1730: *Draft Recommendation Y.17ethreq (Y. 1730) (Requirements for OAM functions in Ethernet based network)*, the content of which is hereby incorporated herein by reference. As set forth in this draft standard, OAM functionality is generally viewed as important in public networks for ease of network operation, for verifying network performance, and to reduce operational costs.

Since Ethernet provides a unique connection oriented layer network and a connectionless layer network, there will be failure modes that are only relevant to Ethernet. Thus, it is also important that Ethernet have its own OAM functionality.

One of the general requirements for Ethernet OAM functionality is that it be configured to automatically detect unintended self-replication, such as may be caused by looping.

Providers may test their networks and their customer's networks by inserting Operation Administration and Maintenance (OAM) frames or flows onto the network and observing their behavior on the network. If the behavior is not as expected, i.e. the flow doesn't pass through the network, there is a problem on the network that will need to be isolated and resolved. Ideally, it would be nice to be able to use OAM flows to detect the presence of backdoors and/or loops created by customer network configurations. Unfortunately, OAM flows are not well suited for testing for the presence of backdoors and/or loops because the loops and backdoors involve unknown, and hence unaddressable, network elements.

One proposal to use OAM flows to detect loops in a bridged Ethernet network has been presented by Muneyoshi Suzuki entitled Loops Detection OAM for Provider Bridged Network, the content of which is hereby incorporated herein by reference. In this proposal, an OAM flow is injected into a customer edge network device with an identification of the provider edge network device that injected the frame. If the frame is later received by the PE device, it can be assumed that it passed through the customer network and that a loop has formed. One disadvantage to this solution is that if a loop actually exists, traffic on the loop is likely to be relatively high thus increasing the chances that the OAM frame will be dropped and, hence, destroying the ability of this method to detect the presence of a loop. Accordingly, it would be advantageous to have a way of performing OAM analysis of a network to detect the presence of loops or backdoors on the bridged network.

SUMMARY OF THE INVENTION

The present invention overcomes these and other drawbacks by providing a method and apparatus for capability based addressing in a communication network to enable protocol data units to be addressed to network constructs with particular capabilities rather than with specific addresses. One of the problems with loop detection is that the network constructs that provide services on the loop are unknown before the loop is detected. By addressing protocol data units (PDUs) to network constructs, such as network ports or network elements, with particular capabilities, it is possible to detect network constructs that should not be present if the network is configured properly.

One use of capability based frame addressing is in connection with loop detection. By generating a multicast OAM PDU with a capability based destination address, it is possible to cause the PDU to be sent to all network constructs with the specified capability or capabilities. If the PDU is a discovery message in an OAM protocol, the discovery message will be received by any network constructs with the defined capability. Receipt of a capability addressed PDU may indicate the presence of a construct with that capacity on the network. Optionally, the protocol may provide for the construct, upon receipt, to respond with its own discovery message. Receipt of a response discovery message may indicate that there is another network construct with the defined capability on the network, which may indicate the presence of a loop or a back door on the customer's network.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, the method and apparatus of the present invention enable protocol data units to be addressed to network constructs based on the capabilities of the network construct instead of the identity of the network construct. By addressing protocol data units (PDUs) to network constructs with particular capabilities, it is possible to communicate with network constructs having the particular capabilities without specifying a list of the network constructs or even knowing the identity of all of the network constructs.

According to one embodiment of the invention, this capability may be used to detect network constructs, such as network elements or ports, that are incorrectly configured on a communication network, which may be used for example to detect loops or backdoors on a bridged network. Specifically, according to one implementation, by generating a multicast OAM PDU with a capability based destination address, it is possible to cause the PDU to be sent to all network constructs with the specified capability or capabilities. Network constructs, as that term is used herein, includes network elements and network ports, either physical or logical. If the PDU is a discovery message in an OAM protocol, the discovery message will be received by any network constructs with the defined capability. In accordance with the OAM protocol, the construct, upon receipt, will respond with its own discovery message. Receipt of a discovery message may indicate that there is another network construct with the defined capability on the network, which may indicate the presence of a loop or a back door on the customer's network.

Figure 3:
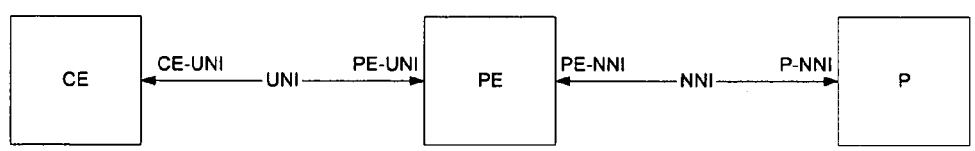
FIG. 3 is functional block diagram one portion of the bridged network architecture of FIG. 1.

FIG. 3 illustrates a CE-PE-P connection in a typical bridged Ethernet network. As shown in FIG. 3, the connection between the CE and PE is based on the User to Network Interface (UNI) protocol. A port on the CE configured to interface the UNI link will be referred to herein as a CE-UNI interface. Similarly, a port on the PE configured to interface with the UNI link will be referred to herein as a PE-UNI interface. The link between the PE and the P network devices is based on Network to Network Interface (NNI) protocol. The ports on the PE and P network devices configured to interface the NNI link will be referred to herein as a PE-NNI interface and a P-NNI interface. The term "interface" as used herein is defined to include both logical interfaces and physical interfaces.

CE, PE, and P network devices, as well as the CE-UNI, PE-UNI, PE-NNI, and P-NNI interfaces each have capabilities defined by the protocols and other attributes assigned to them by the network or by an administrator. According to one embodiment of the invention, a capability MAC address is defined that enables protocol data units to be addressed to network elements, interfaces, or other network constructs according to their capability. For example, using the capability MAC address as the destination MAC address (DA) in a multicast frame, it is possible to address the frame to all network elements or other constructs on the network with the defined capabilities. Using this in connection with an OAM backdoor detection protocol message enables detection of all network elements with the defined capabilities.

Figure 1:
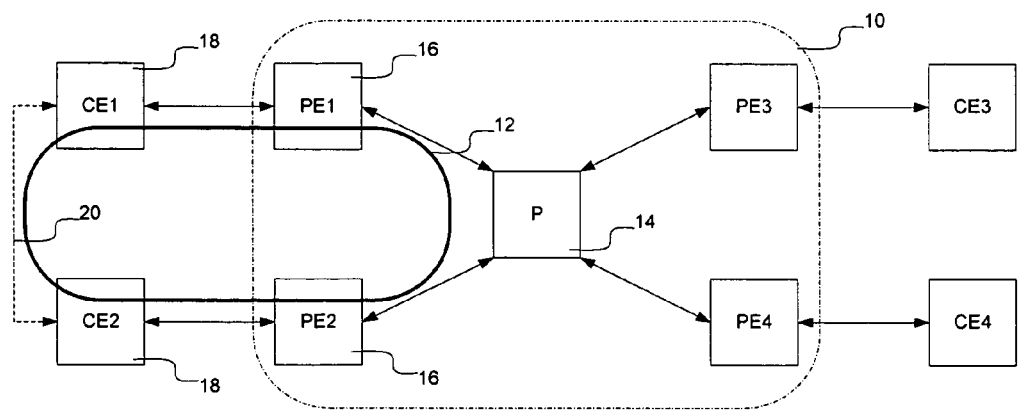
FIG. 1 is a functional block diagram of an example of a bridged network architecture.
Figure 2A:
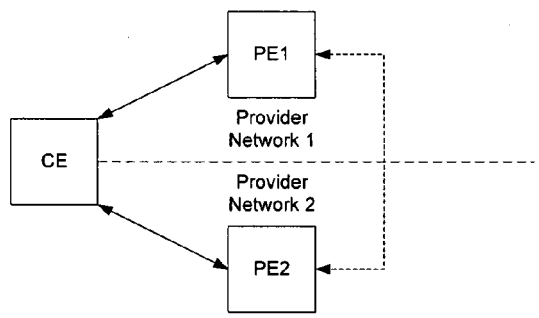
FIGS. 2A and 2B are functional block diagrams illustrating the creation of a backdoor on a customer's network.
Figure 2B:
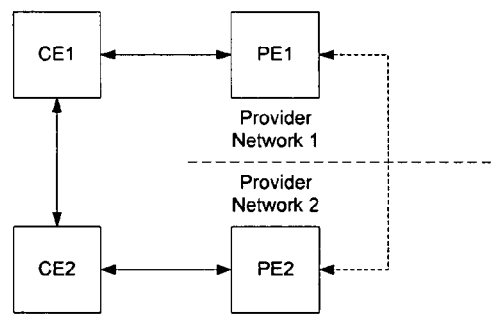

As used herein, the term "capability addressed PDU" will be used to connote the idea that the PDU is addressed to all constructs with a particular capability or set of capabilities. For example, it may be desirable to address PDUs to network elements having a particular capability or a particular set of capabilities. Similarly, it may be desirable to address PDUs to interfaces configured in a particular manner or to interfaces that have a particular capability or set of capabilities. In the examples set forth above with respect to FIGS. 1-3, several example capabilities may be to address PDUs to all PE network elements, all CE network elements, all P network elements, all PE-UNI interfaces, all PE-NNI interfaces, all CE-UNI interfaces, or all P-NNI interfaces. The invention is not limited to this selected set of capabilities, however, as other capability based categories may be established as well. Additionally, the capability-based addressing may stop at hierarchical boundaries, for example at a hierarchical boundary between service provider domains, between domains owned by the same service provider, or at any other logical boundary within a network. Alternatively, the capability based addressing scheme may define capabilities that are able to span hierarchical, such as domain-based, or other boundaries.

According to one embodiment, the capability based addressing may be implemented on a bridged Ethernet network, for example through the use of a special destination Media Access Control (MAC) address. The Institute of Electrical and Electronics Engineers (IEEE) has defined a format for MAC addresses that ensures that the MAC address assigned to every interface on a network, such as a port on a network interface card, will be unique and different from all other MAC addresses assigned to other interfaces.

The MAC address standard specifies that the MAC address must include 6 bytes. The first three bytes are assigned by the IEEE. Typically, the IEEE will assign a unique code to each manufacturer to enable different devices made by different manufacturers to be identified. This first three byte sequence is commonly referred to as the Organizationally Unique Identifier (OUI). The last three bytes are assigned by the manufacturer to enable different devices made by the same manufacturer to be differentiated. There are also a few reserve bits (bits 6 and 7 of the first octet) that allow the MAC address to be identified as a locally assigned or multicast address. As used herein, the term Organizationally Unique Identifier (OUI) will be used to refer to the first three octets generically, regardless of how the local and multicast bits are set.

The OUI may be used to identify LAN MAC addresses and Protocol Identifiers per ANSI/IEEE 802, for use in local and metropolitan area networks. According to an embodiment of the invention, one or more OUIs may be assigned to be used as a capability based addressing space to enable PDUs to be sent to devices with particular capabilities. Specifically, in this embodiment, an OUI such as 01 00 00 may be assigned as defining capability based MAC addresses. In this embodiment, whenever a bridge or other network element received a frame with a DA having an OUI set to 01 00 00, it would know to inspect the remaining three bytes to see if the DA contained one or more capabilities that are associated with the device or a particular port on the device.

Thus, for example, assume that the following MAC addresses were defined:

| Destination MAC Address (in hexadecimal format) | Capability |
| --- | --- |
| 01 00 00 00 00 01 | All Nodes |
| 01 00 00 00 00 02 | PE |
| 01 00 00 00 00 03 | PE-UNI |
| 01 00 00 00 00 04 | PE-NNI |
| 01 00 00 00 00 05 | All UNI |
| 01 00 00 00 00 06 | All NNI |
| 01 00 00 00 00 07 | CE |
| 01 00 00 00 00 08 | CE-UNI |

Multiple other capabilities may be defined as well and the invention is not limited to an embodiment that defines these or any particular subset of these capabilities.

As described above, one potential use for capability based MAC addressing is in connection with back door detection on customer networks. Specifically, by passing a multicast OAM backdoor detection discovery message from a PE to a CE, and setting the destination MAC address for the discovery message equal to a capability defined MAC address associated with PEs, the CE network will distribute the discovery message throughout its network until the discovery message reaches a network element with the specified capability. In this instance, there should only be one PE on a given tree in the customer's network. Thus, if the message reaches a PE and that PE responds with a discovery message, the originating PE knows that there is a back door on the customer's network. This may be indicative of a loop or the potential for forming a loop, as discussed above in connection with FIGS. 2A and 2B. Optionally, an alert may be generated or one of the PE devices deactivated until the condition is rectified. Although in this example the capability addressed PDU is addressed to PE network elements, other capabilities could be used as well to detect the presence of a backdoor or a loop, such as PE-UNI, PE-NNI, All UNI, All NNI, or CE-UNI capabilities.

Figure 6:
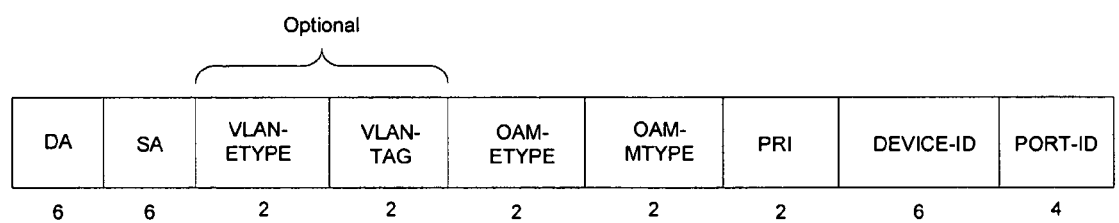
FIG. 6 is an illustration of a discovery message according to an embodiment of the invention.

One embodiment of a protocol data unit that may be used as a discovery message is illustrated in FIG. 6. As shown in FIG. 6, an OAM discovery protocol data unit (OAM-DPDU) may include a destination MAC address (DA) and a source MAC address (SA), both of which are 6 bytes long according to conventional practice. The hello OAM-DPDU may also include other fields, such as the OAM ETYPE, the OAM Message Type (OAM-M-TYPE), the priority (PRI), the source PE device's MAC address (Device-ID), and the port identifier that sourced the PDU (Port-ID). Optionally, the OAM-DPDU may also include additional fields, such as the VLAN-ETYPE field, and a VLAN-TAG field. The invention is not limited to this particular OAM-DPDU or an OAM- DPDU having these specific fields, as numerous other types of discovery PDUs may be created having similar, additional, or a subset of the identified fields.

The OAM discovery protocol includes a response mechanism such that a network element will generate a response upon receipt of an OAM-DPDU. Specifically, in this OAM discovery protocol, network devices periodically send out OAM-DPDU messages. When a network device receives an OAM-DPDU from an unknown bridge, it will respond with a OAM-DPDU. According to one embodiment of the invention, this mechanism is used in combination with capability based addressing to identify network devices by using the capability based addressing feature to target devices with particular capabilities, and using the discovery protocol's response to cause those devices to respond to the capacity addressed OAM-DPDU message so that they can be identified on the network.

Figure 4:
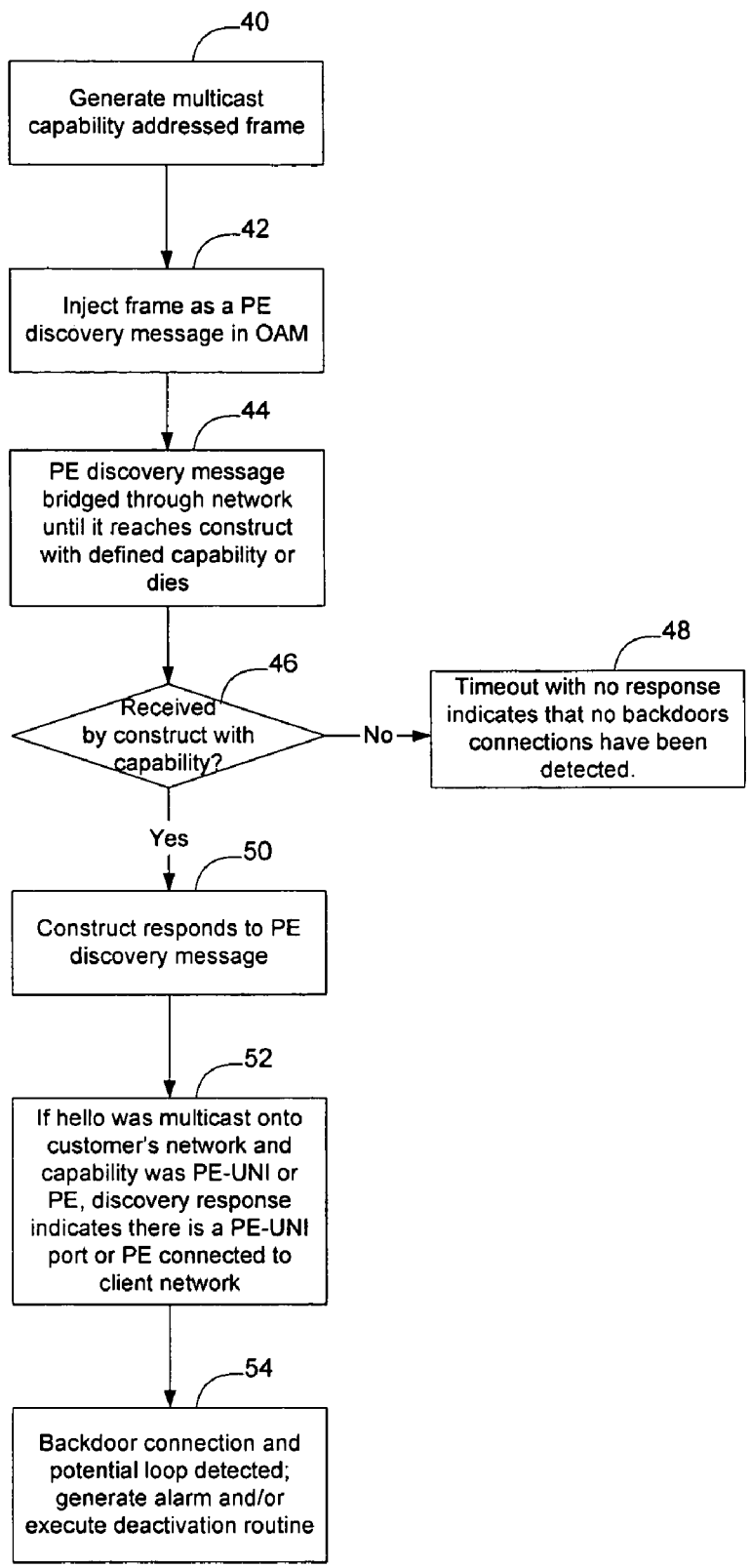
FIG. 4 is a flowchart of an example of how a capability addressed protocol data unit may be used to perform loop detection on a bridged network architecture according to an embodiment of the invention.

FIG. 4 illustrates a flow chart of a method of using an embodiment of the invention to identify PE devices on a customer's network. The invention is not limited to this particular use but rather extends to numerous other uses. The inclusion of a PE device (a device having PE capabilities) on the customer's network is an indication that there may be a loop or a backdoor through the customer's network. While this example illustrates a method of detecting a PE device, the method could also look for other network constructs, such as a CE-UNI interface, a PE-UNI interface or any other network construct that may indicate the presence of a backdoor or a potential loop.

As shown in FIG. 4, initially a multicast capability addressed frame is generated (40). So that the frame will be treated as a capability addressed frame, the OUI is set to the appropriate value so that the bridges will treat it as a capability addressed frame. The remainder of the destination MAC address will be used to identify the capabilities associated with the destination. In this example, the capabilities will be set to the appropriate value for PE so that only network devices configured to implement the PE capability will receive the frame and all others will bridge it through to the other port(s). In this example, the discovery message would include the capability MAC address as its DA, the PE's MAC address as the SA, and other information as set forth above in connection with FIG. 6.

The frame is then injected as a PE discovery message in OAM (42) into the customer's network. Generally, the PE device configured to interface with the CE device for the customer's network will transmit the hello frame to the CE. Since the CE does not have the same capability as a PE, it will recognize that the frame is not addressed to it. Accordingly, the CE will bridge the frame onto the customer network. The discovery message will be bridged until it reaches a construct with the defined capability or dies (44). Since the discovery message contains a PE capability definition, in this example the discovery message would propagate through the customer network until it reached a PE network or died.

The network element that injected the packet or another network element configured to listen for a response on the network then waits to see if it receives a response to the discovery message (46). If the network element times out with no response, to the discovery message, it may infer that no backdoor connections have been detected (48). If the discovery message is received by a network device containing a capability that matches the capability definition in the message, it will respond to the discovery message (50). The response will use the original PE's MAC address as the DA, the newly identified PE's MAC address as the SA, and will be propagated back through the customer network and bridged from the CE to the PE. Other response message formats may be used as well, and the invention is not limited to a response having the format used in this example.

If the discovery message was multicast onto the customer's network and the capability was PE-UNI or PE, a discovery message response indicates that there is a PE-UNI port or PE connected to the client network (52). Thus, the a backdoor connection or potential loop may be detected (54) which may cause the network element to generate an alarm and/or execute a deactivation routine (56).

Alternatively, according to another embodiment of the invention, receipt by a network element of a capability addressed discovery message may indicate to that network element that there is another network element on the network with that capability. For example, if only network elements with PE capabilities are allowed to generate discovery messages with PE capabilities, the mere receipt of a PE capability discovery message would indicate to the network element that there is another network element on the network. Receipt of an unexpected capability addressed discovery message thus may cause an alarm or corrective action to be taken without engaging in a discovery-response exchange.

Additionally, according to another embodiment of the invention, network elements may be configured to filter packets based on capability addressed source address. Specifically, in this embodiment of the invention, a network element may generate a protocol data unit indicating, in the source address, the capability of the construct that generated or issued the protocol data unit. By listening for protocol data units that are generated by a network element of a particular type, other network elements may detect the presence of a network element that should not be present on the network. This, also, may be used to detect the presence of a back door or potential loop on the network. Optionally, the protocol data unit according to this embodiment may also include the source MAC address at another location other than where the conventional source MAC address should go, such as in the payload portion of the protocol data unit, to enable the identity of the network element to be subsequently identified.

Figure 5:
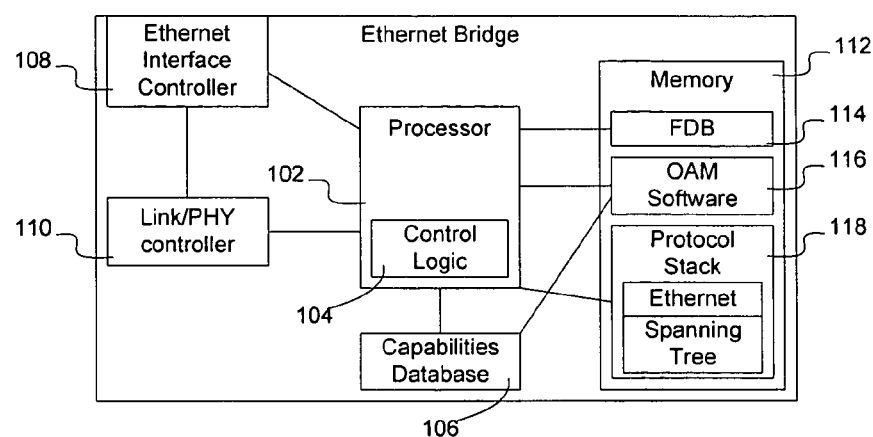
FIG. 5 is a functional block diagram of an Ethernet bridge according to an embodiment of the invention.

FIG. 5 illustrates a network element 100 configured to implement an embodiment of the invention. The embodiment illustrated in FIG. 5 is an Ethernet bridge network element. The invention is not limited to implementation in an Ethernet bridge, however, as other network elements may be used as well. As shown in FIG. 5, the Ethernet bridge generally includes a processor 102 containing control logic 104 configured to perform functions described to enable the Ethernet bridge to generate, transmit, receive, and understand frames containing capability based MAC addresses. The processor may interface a capabilities database 106 that defines the capabilities of the network element as well as optionally defining other capabilities to enable the network element 100 to generate frames containing capability MAC addresses designed to be transmitted to other network elements.

The network element may be provided with one or more components (hardware and/or software) to enable it to communicate on a communication network. In the embodiment illustrated in FIG. 5, the network element includes an Ethernet interface controller 108 and a link/PHY controller 110, although the invention is not limited to this particular example.

The network element may include a memory 112 configured to store data and instructions configured to enable the network element to participate in communications on the network. For example, the memory may contain a Filtering DataBase (FDB) 114 to enable it to filter frames on the network. Optionally, the FDB may contain one or more entries related to the capability based MAC addresses that indicate to the network element that the frame should be received and/or analyzed by the network element.

The memory may also include OAM software 116 to enable it to participate in OAM functions on the network and a protocol stack 118 containing data and instructions configured to enable it to participate in protocol exchanges on the network. In the illustrated embodiment the protocol stack has been configured to enable the network element to participate in Ethernet protocol exchanges and OAM protocol exchanges on the network. The invention is not limited to a protocol stack of this nature as additional or fewer protocols may be supported by the protocol stack.

The functions described above may be implemented as a set of program instructions that are stored in a computer readable memory within the network element and executed on one or more processors within the network element. However, it will be apparent to a skilled artisan that all logic described herein can be embodied using discrete components, integrated circuitry, programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of addressing a protocol data unit by a first network construct to a second network construct on a communication network, the method comprising the steps of:
generating, by the first network construct, the protocol data unit, the protocol data unit containing, as an address, at least one capability of the second network construct, the capability addressed protocol data unit being addressed to all constructs on the communication network having the at least one capability, the capability addressed protocol data unit specifying at least one of a set of possible capabilities to enable the capability addressed protocol data unit to be selectively received by only those network constructs with the selected capability; and
issuing, by the first network construct, the protocol data unit for transmission onto the communication network.

2. The method of claim 1, wherein the address is a destination address.

3. The method of claim 2, wherein the destination address is a destination Media Access Control (MAC) address.

4. The method of claim 1, wherein the second network construct is a provider edge network element, and wherein the capability is specific to provider edge network elements.

5. The method of claim 1, wherein the second network construct is a port of a particular type on a network element, and wherein the capability is specific to that type of port.

6. The method of claim 1, further comprising listening for a reply to the protocol data unit from the communication network.

7. The method of claim 6, wherein receipt of a reply indicates the presence of the network construct on the communication network.

8. A method of receiving a protocol data unit by a network construct on a communication network, the method comprising:
filtering protocol data units, by the network construct, to identify capability addressed protocol data units that contain, as an address, at least one capability, the capability addressed protocol data unit being addressed to all constructs on the communication network having the at least one capability, the capability addressed protocol data unit specifying at least one of a set of possible capabilities to enable the capability addressed protocol data unit to be selectively received by only those network constructs with the selected capability; and
receiving, by the network construct, the identified capability addressed protocol data units that match at least one capability of the network construct.

9. The method of claim 8, wherein the address is a destination address.

10. The method of claim 8, wherein the protocol data unit contains a source Media Access Control (MAC) address and a destination MAC address, and wherein the address is at least one of the source MAC address and the destination MAC address.

11. A method of receiving a protocol data unit by a network construct on a communication network, the method comprising:
filtering protocol data units, by the network construct, to identify protocol data units that contain, as an address, at least one capability; and
receiving identified protocol data units by the network construct;
wherein the protocol data unit contains a source Media Access Control (MAC) address and a destination MAC address, and wherein the address is at least one of the source MAC address and the destination MAC address; and
wherein the destination MAC address comprises:
a first field containing an Organizationally Unique Identifier (OUI) that identifies the protocol data unit to the network construct as containing a capability based address; and
a second field identifying the capability of the network construct to which the protocol data unit is addressed.

12. The method of claim 8, the method further comprising the step of responding to the protocol data unit by the network construct.

13. The method of claim 12, wherein the step of responding comprises generating a response protocol data unit and sending the response protocol data on the communication network.

14. A method of discovering the presence of any network constructs with a first capability on a communication network, the method comprising the steps of:
flooding, by a first network construct, a capability addressed protocol data unit on the communication network, the capability addressed protocol data unit being addressed to any network constructs on the communication network having the at least one capability, the capability addressed protocol data unit specifying at least one of a set of possible capabilities to enable the capability addressed protocol data unit to be selectively received by only those network constructs with the selected capability; and listening, by the first network construct, for a response to the capability addressed protocol data unit.

15. The method of claim 14, wherein the protocol data unit is an Operation Administration and Maintenance (OAM) packet in an OAM flow.

16. The method of claim 14, wherein the protocol data unit is a hello message.

17. The method of claim 14, wherein the step of flooding comprises at least one of broadcasting and multicasting to cause the protocol data unit to be forwarded throughout a domain on the communication network.

18. A network construct, comprising:

control logic configured to enable the network construct to receive capability addressed protocol data units, each capability addressed protocol data unit being addressed to all constructs on the communication network having the at least one capability, each capability addressed protocol data unit specifying at least one of a set of possible capabilities to enable the capability addressed protocol data unit to be selectively received by only those network constructs with the selected capability, and wherein the control logic is further configured to select capability addressed protocol data units for processing which have a capability indication that matches a capability of the network construct.

19. The network construct of claim 18, wherein the control logic is further configured to enable the network construct to respond to capability addressed protocol data units.

* * * * *